(12) United States Patent
Knox

(10) Patent No.: US 10,448,336 B2
(45) Date of Patent: Oct. 15, 2019

(54) SYSTEMS AND METHODS TO VARY RATE OF COMMUNICATION BETWEEN GPS TRANSCEIVER AND AT LEAST ONE SATELLITE FOR OUTPUTTING DIRECTIONS

(71) Applicant: Lenovo (Singapore) Pte. Ltd., New Tech Park (SG)

(72) Inventor: Jonathan Gaither Knox, Morrisville, NC (US)

(73) Assignee: Lenovo (Singapore) Pte. Ltd., Singapore (SG)

(*) Notice: Subject to any disclaimer, the term of this patent is extended or adjusted under 35 U.S.C. 154(b) by 0 days.

(21) Appl. No.: 15/655,621

(22) Filed: Jul. 20, 2017

(65) Prior Publication Data
US 2019/0028973 A1 Jan. 24, 2019

(51) Int. Cl.
*H04W 52/02* (2009.01)
*H04W 4/02* (2018.01)
*G01S 19/24* (2010.01)
*G01S 19/34* (2010.01)

(52) U.S. Cl.
CPC .......... *H04W 52/0254* (2013.01); *G01S 19/24* (2013.01); *G01S 19/34* (2013.01); *H04W 4/027* (2013.01)

(58) Field of Classification Search
CPC .......... G08G 1/096827; G08G 1/0104; H04W 4/025
See application file for complete search history.

(56) References Cited

U.S. PATENT DOCUMENTS

| | | | | |
|---|---|---|---|---|
| 5,257,195 A | * | 10/1993 | Hirata | G01S 19/49 342/357.31 |
| 7,392,134 B2 | * | 6/2008 | Tauchi | G01C 21/26 340/988 |
| 8,417,448 B1 | * | 4/2013 | Denise | G01C 21/3415 340/990 |
| 8,706,131 B2 | * | 4/2014 | Winters | G01S 5/0027 340/988 |
| 9,008,965 B2 | | 4/2015 | Kitatani | |
| 9,097,536 B2 | | 8/2015 | Kelly et al. | |
| 9,175,963 B2 | | 11/2015 | Kelly | |

(Continued)

OTHER PUBLICATIONS

Rod D. Waltermann, Russell Speight Vanblon, Nathan J. Peterson, Arnold S. Weksler, John Carl Mese, "Disablement of Global Positioning System Transceiver While Providing Directions", related pending U.S. Appl. No. 15/788,202 filed Oct. 19, 2017.

(Continued)

*Primary Examiner* — Dung Hong
(74) *Attorney, Agent, or Firm* — John L. Rogitz; John M. Rogitz

(57) ABSTRACT

In one aspect, a device includes at least one processor, a global positioning system (GPS) transceiver accessible to the at least one processor, a motion sensor accessible to the at least one processor, a cellular communication transceiver accessible to the at least one processor, and storage accessible to the at least one processor. The storage bears instructions executable by the at least one processor to provide directions to follow a route to a destination and to vary a rate at which the GPS transceiver communicates with at least one satellite for providing the directions.

20 Claims, 6 Drawing Sheets

(56) References Cited

U.S. PATENT DOCUMENTS

| | | | |
|---|---|---|---|
| 9,829,325 | B2 | 11/2017 | Waltermann et al. |
| 2005/0280576 | A1* | 12/2005 | Shemesh .................. G01S 19/24 342/357.64 |
| 2006/0116818 | A1* | 6/2006 | Chao .................. G01C 21/3415 701/431 |
| 2006/0164230 | A1 | 7/2006 | DeWind et al. |
| 2007/0208497 | A1* | 9/2007 | Downs .................. G08G 1/0104 701/117 |
| 2009/0273513 | A1* | 11/2009 | Huang .................... G01S 19/13 342/357.31 |
| 2010/0023253 | A1* | 1/2010 | Jung .................. G01C 21/3626 701/533 |
| 2010/0033338 | A1* | 2/2010 | Sverrisson ............. G08G 1/207 340/686.1 |
| 2010/0039316 | A1* | 2/2010 | Gronemeyer ........... G01S 19/34 342/357.48 |
| 2011/0143777 | A1 | 6/2011 | Kim et al. |
| 2011/0205115 | A1* | 8/2011 | Gronemeyer ........... G01S 19/34 342/357.74 |
| 2011/0215903 | A1* | 9/2011 | Yang ...................... G01C 21/20 340/8.1 |
| 2012/0221207 | A1* | 8/2012 | Nakamura ......... G01C 21/3407 701/41 |
| 2014/0024392 | A1* | 1/2014 | Su ......................... H04W 4/025 455/456.2 |
| 2014/0365965 | A1 | 12/2014 | Bray et al. |
| 2017/0124115 | A1* | 5/2017 | Duan ...................... H03M 7/60 |
| 2018/0335524 | A1* | 11/2018 | Youssef .................. G01S 19/10 |

OTHER PUBLICATIONS

Rod D. Waltermann, Russell Speight Vanblon, Nathan J. Peterson, Arnold S. Weksler, John Carl Mese, "Disablement of Global Positioning System Transceiver While Providing Directions", related pending U.S. Appl. No. 14/962,410, applicant's response to non-final office action filed Jul. 28, 2017.

Rod D. Waltermann, Russell Speight Vanblon, Nathan J. Peterson, Arnold S. Weksler, John Carl Mese, "Disablement of Global Positioning System Transceiver While Providing Directions", file history of related U.S. Appl. No. 14/962,410 filed Dec. 8, 2015.

Rod D. Waltermann, Russell Speight Vanblon, Nathan J. Peterson, Arnold S. Weksler, John Carl Mese, "Disablement of Global Positioning System Transceiver While Providing Directions", related U.S. Appl. No. 15/788,202, Non-Final Office Action dated Jul. 26, 2018.

Rod D. Waltermann, Russell Speight Vanblon, Nathan J. Peterson, Arnold S. Weksler, John Carl Mese, "Disablement of Global Positioning System Transceiver While Providing Directions", Final Office Action dated Jan. 25, 2019.

Rod D. Waltermann, Russell Speight Vanblon, Nathan J. Peterson, Arnold S. Weksler, John Carl Mese, "Disablement of Global Positioning System Transceiver While Providing Directions", related U.S. Appl. No. 15/655,621, Applicant's response to Non-Final Office Action filed Oct. 12, 2018.

\* cited by examiner

SYSTEMS AND METHODS TO VARY RATE OF COMMUNICATION BETWEEN GPS TRANSCEIVER AND AT LEAST ONE SATELLITE FOR OUTPUTTING DIRECTIONS

BACKGROUND

When a device such as a smart phone provides directions to a destination, use of the device's GPS transceiver to output the directions can drain the device's battery undesirably fast. As recognized herein, this can be frustrating to a user because the drain on the battery can leave the device without enough battery power to execute other tasks and because the battery may run out of power before another opportunity to charge it arises. There are currently no adequate solutions to the foregoing computer-related, technological problem.

SUMMARY

Accordingly, in one aspect a device includes at least one processor, a global positioning system (GPS) transceiver accessible to the at least one processor, a motion sensor accessible to the at least one processor, a cellular communication transceiver accessible to the at least one processor, and storage accessible to the at least one processor. The storage bears instructions executable by the at least one processor to identify directions to a location and determine, based on one or more factors related to the directions, at least a first rate at which the GPS transceiver is to communicate with at least one satellite for outputting the directions. The instructions are also executable by the at least one processor to output directions for following a route to the location and communicate with the at least one satellite at the first rate for at least a portion of the outputting of directions.

In still another aspect, a method includes providing, using a device, directions to follow a route to a destination. The method also includes varying a speed at which a GPS transceiver on the device communicates with at least one satellite for providing the directions.

In still another aspect, an apparatus includes a first processor, a network adapter, and storage. The storage bears instructions executable by a second processor of a first device for providing directions to follow a route to a destination and varying a rate at which a GPS transceiver accessible to the second processor communicates with a second device for providing the directions. The first processor transfers the instructions to the first device over a network via the network adapter.

The details of present principles, both as to their structure and operation, can best be understood in reference to the accompanying drawings, in which like reference numerals refer to like parts, and in which:

DETAILED DESCRIPTION

Figure 1:
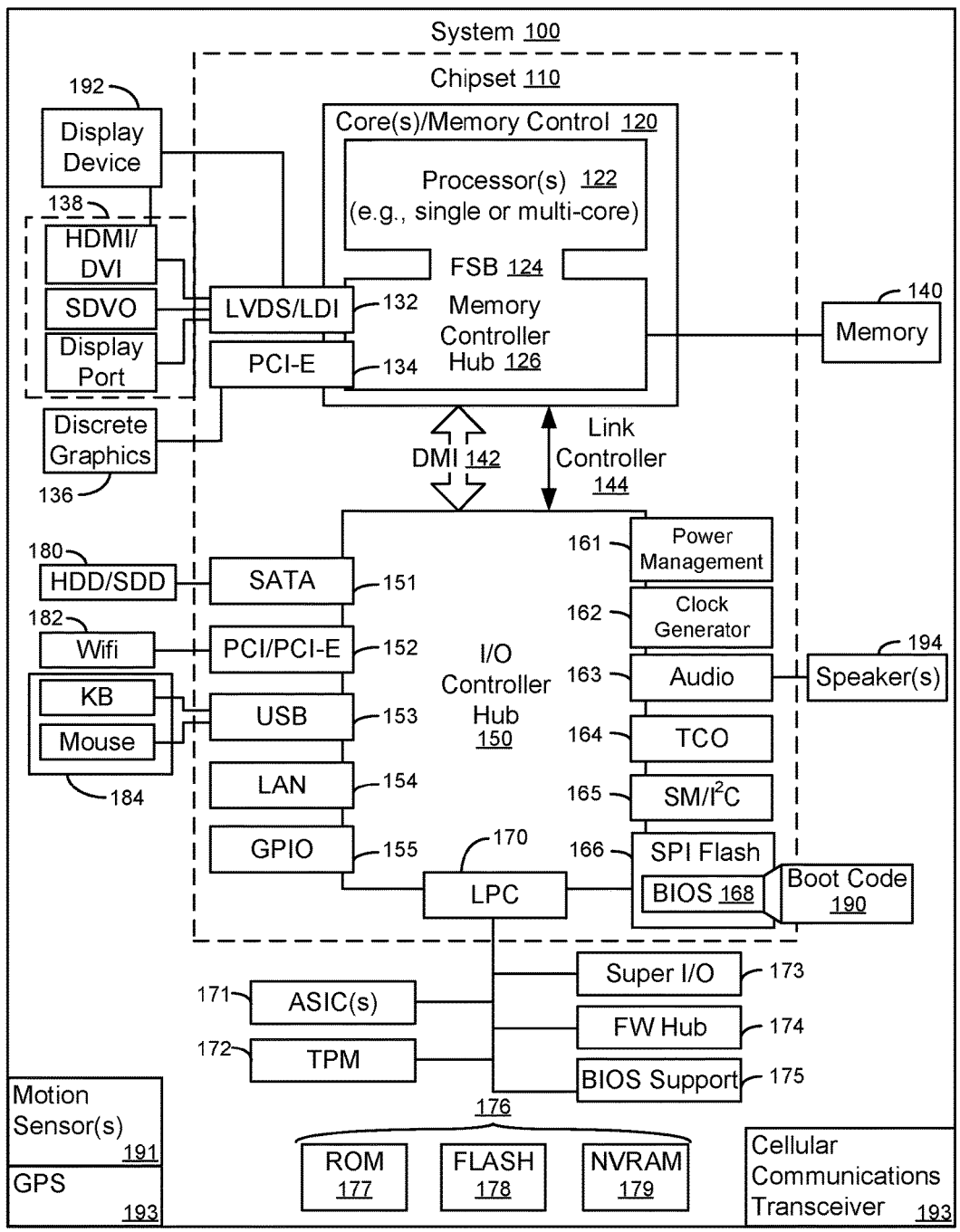
FIG. 1 is a block diagram of an example system in accordance with present principles.

Disclosed herein are systems and methods to use data like accelerometer data, compass data, cellular tower data, other device data, etc. to determine whether a user is still on course when following directions, such as when the user is following the directions but will be on the highway for an extended time period. Processing these types of data can use less processing and communication power than if the location of the device was constantly or more-frequently tracked using the device's GPS transceiver alone. Also in accordance with present principles, the device can resume using the GPS transceiver when, for example, the time between various turns that are to be made decreases, or an unexpected course change is detected, so that the relatively more-accurate GPS transceiver may be used for determining device location and hence outputting directions at the most appropriate time/location for outputting the directions. Thus, the interval that the GPS transceiver communicates with satellites may vary based on, e.g., intended course vs. actual course traveled and/or based on a desired resolution to follow the intended course.

As an example, when a user is following directions but on a long stretch of road, the interval/resolution may be once per second. When the user gets off course on the long stretch of road, the interval/resolution may increase to 100 times per second so that the location may be more closely tracked as accurately as possible.

As another example, when a user is following directions that take the user on short stretches of different roads, the interval/resolution may be 10 times per second. When the user gets off course on one of the short stretches of road, the interval/resolution may be increased 100 times per second. Thus, more resolution may be used during urban driving to determine if the user is off course and hence that a course correction should be provided, while less resolution may be used for interstate highway travel for on course navigation and course correction.

With respect to any computer systems discussed herein, a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple, Google, or Microsoft. A Unix or similar such as Linux operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any conventional general-purpose single- or multi-chip processor that can execute logic by means of various lines such as address lines, data lines, and control lines and registers and shift registers. Moreover, any logical blocks, modules, and circuits described herein can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/ or made available in a shareable library.

Logic when implemented in software, can be written in an appropriate language such as but not limited to C# or C++, and can be stored on or transmitted through a computer-readable storage medium (that is not a transitory, propagating signal per se) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a wireless telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case, the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Additionally, the system 100 may include one or more motion sensors 191 such as a gyroscope that senses and/or measures the orientation of the system 100 and provides input related thereto to the processor 122. The motion sensor(s) 191 may also include an accelerometer that senses acceleration and/or movement of the system 100 and provides input related thereto to the processor 122, as well as a compass that senses direction/orientation of the system 100 and provides input related thereto to the processor 122. Still further, the system 100 may include a GPS transceiver 193 that is configured to communicate with at least one satellite to receive/identify geographic position information and provide the geographic position information to the processor 122. However, it is to be understood that another suitable position transceiver other than a GPS transceiver may be used in accordance with present principles to determine the location of the system 100.

The system 100 may further include a cellular transceiver 195 accessible to the processor 122. The cellular transceiver 195 may be or include a wireless cellular telephony transceiver and/or a wireless Internet data transceiver. The transceiver 195 may enable the system 100 to communicate over a cellular network such as a wireless cellular telephony network and/or over a wireless cellular data network such as a 3G or 4G wireless network. A cellular base station (such as the base station 216 to be described below) may be used to facilitate telephony, SMS, and data communication between the system 100 and another device.

Still further, the system 100 may include an audio receiver/microphone that provides input from the microphone to the processor 122 based on audio that is detected, such as via a user providing audible input to the microphone. A camera may also be included that gathers one or more images and provides input related thereto to the processor 122. The camera may be a thermal imaging camera, a digital camera such as a webcam, a three-dimensional (3D) camera, and/or a camera otherwise integrated into the system 100 and controllable by the processor 122 to gather pictures/images and/or video.

It is to be understood that an example client device or other machine/computer may include fewer or more features than shown on the system 100 of FIG. 1. In any case, it is to be understood at least based on the foregoing that the system 100 is configured to undertake present principles.

Figure 2:
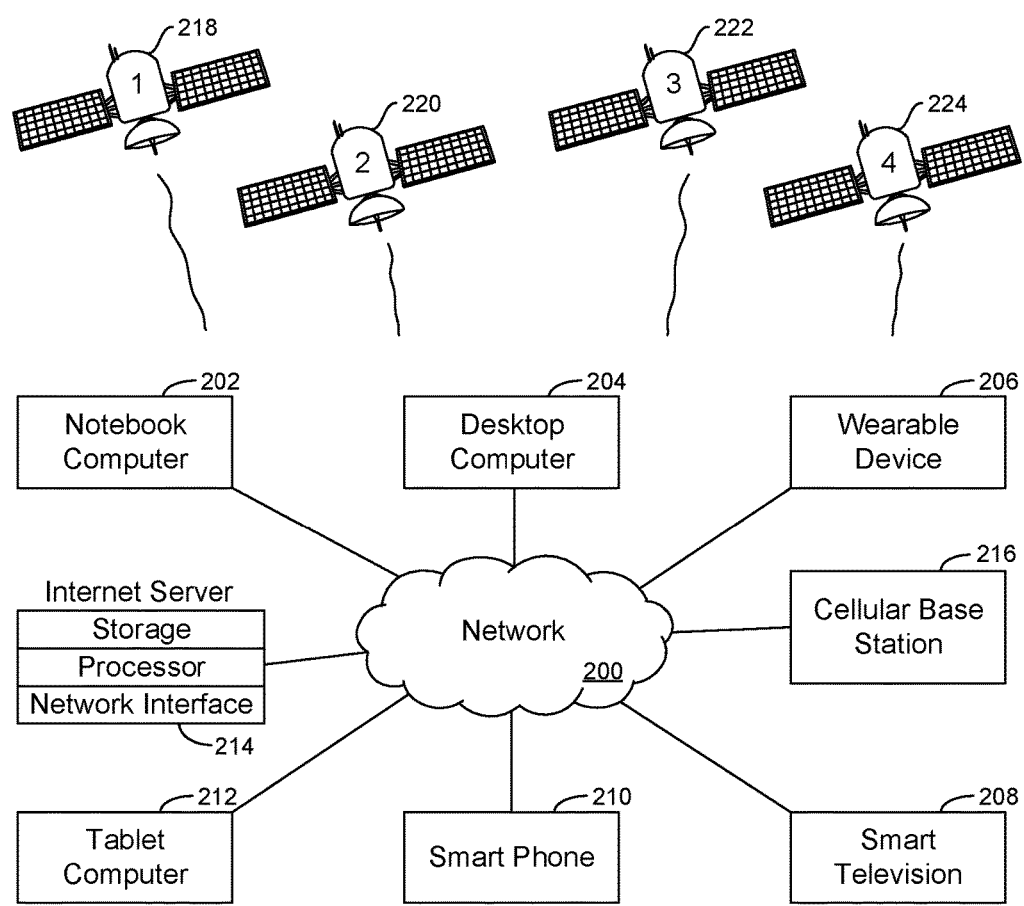
FIG. 2 is a block diagram of an example network of devices in accordance with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, a cellular base station 216, and a server 214 such as an Internet server that may provide cloud storage accessible to the devices 202-212, 216. It is to be understood that the devices 202-216 are configured to communicate with each other over the network 200 to undertake present principles, such as using a cellular network, using the Internet, etc.

Describing the cellular base station 216 in more detail, it may be a non-GPS station used for cellular telephony and cellular data communications with the other devices 202-214 over a cellular network such as a cellular telephone or cellular data network. However, in some embodiments it may also include a fixed GPS ground-based station for assisting each of the devices 202-214 in identifying its respective GPS coordinates.

Also, to assist each of the devices 202-214 in identifying its respective GPS coordinates, each of the devices 202-214 may use its own respective GPS transceiver to each communicate with four satellites 218, 220, 222, and 224 in orbit above Earth to identify the respective device's current GPS coordinates and/or to perform trilateration to determine the respective device's current GPS coordinates.

Figure 3:
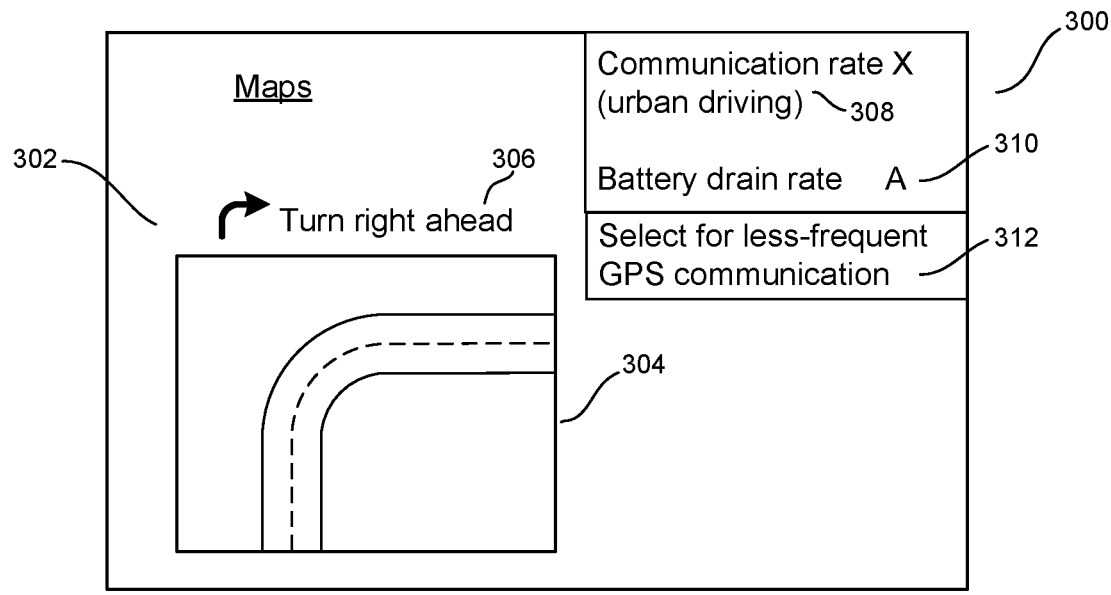
FIGS. 3, 4, and 9 are example user interface (UIs) in accordance with present principles.

Now in reference to FIG. 3, it shows an example user interface (UI) 300 presentable on the display of a device such as a smart phone. The UI 300 is understood to be presentable to output directions 302 to a destination in accordance with present principles. Thus, the directions 302 may include a graphical map 304 and text directions 306 directing a user to the destination via a certain route. While providing the directions, the device may also vary the current rate/speed of communication of the device's GPS transceiver with one or more satellites, where such communication may be done to update the current location of the device and thus to determine whether the device/user is following the directions. By varying the rate/speed based on certain conditions, battery power may be saved by using a slower rate/speed where appropriate while still using a relatively faster rate/speed under other conditions.

Accordingly, additional data may also be presented on the UI 300, such as an indication 308 of the rate/speed at which the device is currently communicating with one or more satellites using the device's GPS transceiver to update the directions and confirm that the directions are being followed in accordance with present principles. The rate/speed has been generally designated as "X" for simplicity, but may be expressed in terms of a baud rate and/or in Hertz (Hz). The indication 308 may also include data indicating a factor that led to the device using the indicated rate/speed of communication, which in this case is that urban driving is currently ongoing.

An additional indication 310 may also be presented, with the indication 310 indicating a rate at which the device's battery is currently draining based on usage of the current communication rate/speed of "X". The battery drain rate has been generally designated as "A" for simplicity, but may be expressed in terms of a battery percentage or amount drained per unit of time.

The UI 300 may also include a selector 312 that is selectable using, for example, touch input directed to the selector 312 or cursor input directed to the selector 312. The selector 312 may be selected to provide a user command to use a relatively slower rate/speed of communication with one or more satellites than the indicated rate/speed of "X".

Figure 4:
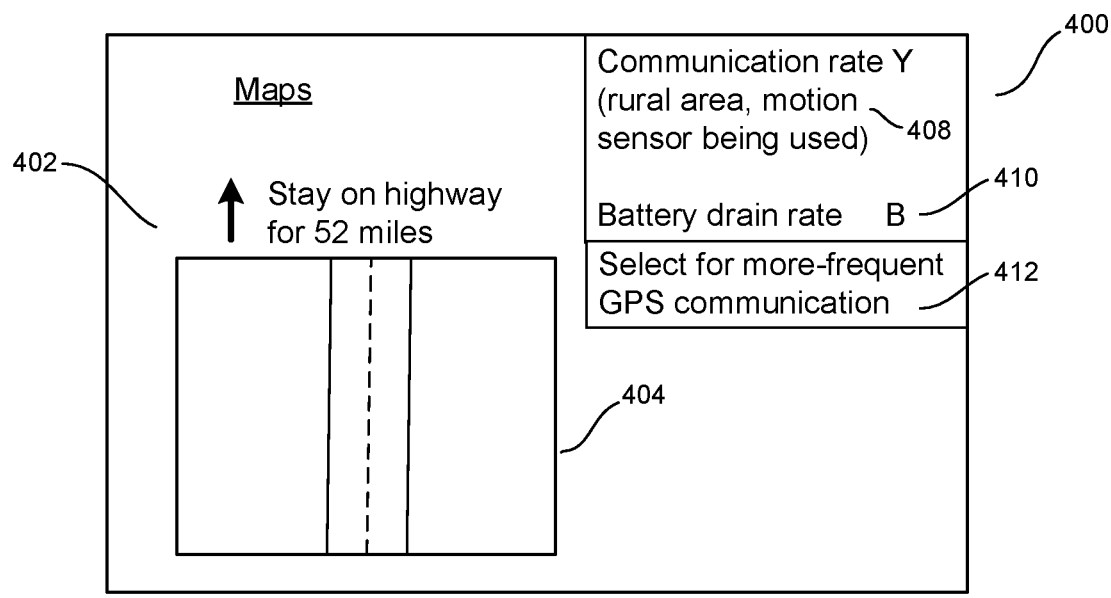

Referring now to FIG. 4, it shows another UI 400 presentable on the display of a device such as a smart phone. The UI 400 is also understood to be presentable to output directions 402 to the same destination as was discussed in reference to FIG. 3. Thus, the directions 402 may also include a graphical map 404 and text directions 406 directing the user to the destination.

As in FIG. 3, additional data may also be presented on the UI 400. For example, an indication 408 may be presented of the current rate/speed at which the device is communicating with one or more satellites using the device's GPS transceiver to update the directions and confirm that the directions are being followed in accordance with present principles. The rate/speed has been generally designated as "Y" for simplicity, but is understood to be a slower rate/speed of communication than rate/speed "X" described in reference to FIG. 3. This may be because, for example, the user is no longer driving in an urban area and is now driving in a rural area with less turns and hence less opportunity for going off route. Thus, the indication 408 may also include data indicating a factor that led to the device using the indicated current rate/speed of communication, which in this case is that rural driving is currently ongoing.

An additional indication 410 may also be presented. The indication 410 may indicate a rate at which the device's battery is currently draining based on usage of the communication rate/speed of "Y". The battery drain rate has been generally designated as "B" for simplicity, but may be expressed in terms of a battery percentage or amount drained per unit of time.

Additionally, the UI 400 may include a selector 412 that is selectable to provide a user command to use a relatively faster rate/speed of communication with one or more satellites than the indicated rate/speed of "Y". For example, the selector 412 may be selected to provide a user command for the device to go back to using the rate/speed of "X".

Figure 5:
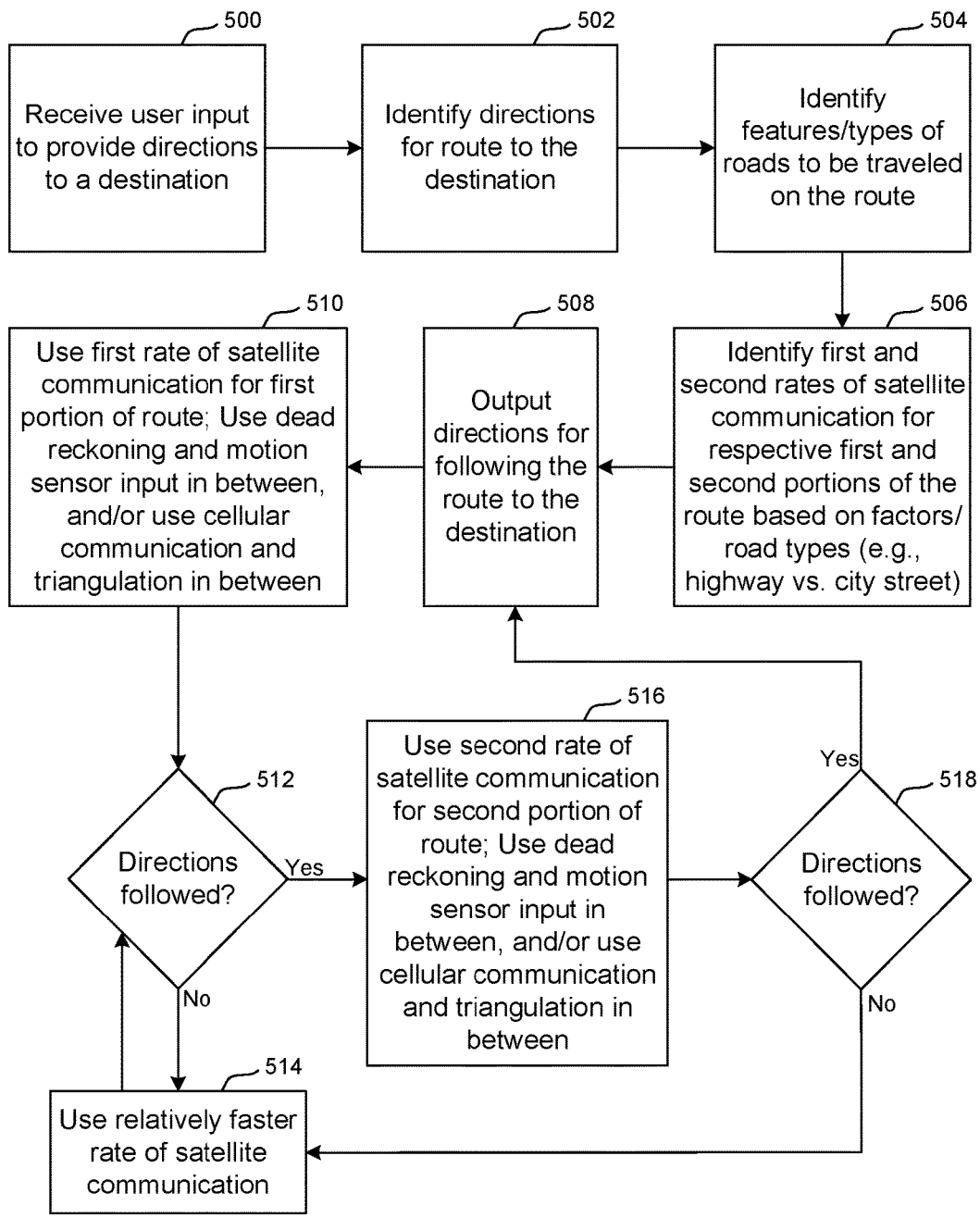
FIGS. 5-8 are flow charts of example algorithms in accordance with present principles.

Continuing the detailed description in reference to FIG. 5, it shows example logic that may be executed by a device such as the system 100 and/or the device described above in reference to FIGS. 3 and 4 in accordance with present principles. Beginning at block 500, the device may receive user input to provide directions to a destination, such as a verbal or typewritten request to provide directions and input of an address of the destination. The logic may then move to block 502 where the device may on its own determine a route(s)/directions to the destination, and/or communicate with a remotely-located server to receive a route(s)/directions as determined by the server. As an example, a map service such as MapQuest or Google Maps may be used for identifying the directions.

From block 502 the logic may then proceed to block 504. At block 504 the device may identify one or more features of the portions of roads to be traveled along the route and/or one or more road types for the portions of roads to be traveled along the route. The device may identify them on its own and/or based on communication with the server as indicated by the server. One example of a feature is a turn to be made. Another example is whether the route is through an urban area, a suburban area, a rural area, or a combination of those three. Yet another example of a feature is an average speed at which a vehicle might drive while following part of the directions, as based on current traffic conditions and posted speed limits for that part of the directions. As for road types, they may include a city street road type and a highway road type. Another road type may be, e.g., an easement road type.

The features/types themselves may be identified based on metadata accessible to the device and/or accessible to the server providing such information to the device. The metadata may have been provided by a governmental entity, a technology corporation, or another third party providing data classifying certain portions of roads along the route as having certain road features or being of certain road types.

From block 504 the logic may then proceed to block 506. At block 506 the device may identify first and second rates/speed of satellite communication (e.g., in Hertz) at which the device is to communicate with satellites along certain respective portions of the route. The satellite communication may be for updating the current location of the device as it travels along the route so that the device may determine if the directions are being followed.

The rates may be identified based on the rates being indicated by the server with which the device is communicating. Additionally, or alternatively, the rates may be identified from a relational database accessible to the device that correlates various features and road types that might be identified with respective rates of satellite communication. For example, the relational database may indicate that for city street driving, the rate of "X" should be used, while for highway driving the rate of "Y" should be used.

From block 506 the logic may then proceed to block 508. At block 508 the device may output directions for following the route to the destination as cached at the device (e.g., once received from the server) and/or as received from the server periodically as the directions are followed. The directions may be output on a display as disclosed in reference to FIGS. 3 and 4, and/or may be output via another method such as audibly providing the directions using a speaker on the device or in the vehicle being driven by the user. From block 508 the logic may then proceed to block 510.

At block 510 the device may use the first rate of satellite communication for a first portion of the route for which the device and/or server determined that the first rate of satellite communication should be used. For example, the device may use the first rate for the first portion based on the particular road type to be traversed during the first portion of the route.

Also at block 510, in between satellite communications the device may use other methods of tracking its position as it traverses the route. For example, the device may receive input from one or more motion sensors on the device or otherwise accessible to it, such as input from an accelerometer, gyroscope, or compass. The device may then execute dead reckoning software and/or other inertial navigation software to perform calculations to estimate current GPS coordinates for the device and/or to estimate a distance traveled and in what direction(s) over a given period of time (e.g., based on speed values, acceleration values, and/or direction values from the motion sensor(s)). This data related to distance and direction(s) estimated to be traveled over the given period of time may then be compared against a map of the current area in which the device is disposed to estimate where the device is along the route that is to be traveled and hence to determine whether the user is still following the directions.

Additionally, or alternatively, at block 510 cellular communication may be used as another way of tracking the device's position in between satellite communications as it traverses the route. For example, the device may communicate with two or more different cellular base stations (e.g., non-GPS stations) to triangulate its current position based on the known positions of those cellular base stations. The device may also communicate with a most-proximate cellular base station to receive data via a cellular data link, with the received data indicating an area surrounding the cellular base station and hence the location of the device. A cellular data link may also be used to receive an indication of an estimation of the current position of the device, as calculated by the cellular base station and/or server communicating with the device through the cellular base station. Still further, the device may communicate with a cellular base station to, based on a known location for the base station, determine a current location of the device based on the strength of signals between the device and the base station and/or based on the time of flight for signals transmitted from the device to bounce off the cellular base station and arrive back at the device.

Still in reference to FIG. 5, from block 510 the logic may then proceed to decision diamond 512. At diamond 512 the device may determine whether the directions are being followed. As an example, this may be determined by comparing the current position of the device (as identified based on satellite communication or as identified using another method in between satellite communications as set forth above) to the route and/or map data to determine whether the device has advanced along the route from a previous position or whether the device has not advanced along the route (e.g., has stopped, has turned onto a road that is not on the route, etc.). Additionally, or alternatively, an estimated position at a particular point in time may be compared to the current actual position of the device at that point in time (as identified based on satellite communication or as identified using another method in between satellite communications as set forth above) to determine if the directions are being followed.

A negative determination at diamond 512 may cause the logic to proceed to block 514. At block 514, owing to the directions not being followed, the device may use a relatively faster rate of communication with the satellites (in this case, faster than the first rate) to receive more frequent updates on the current location of the device using the device's relatively more accurate but power consuming GPS transceiver. In this way, updates to the directions and/or a detour to get back on the previous route may be provided at appropriate times (e.g., a threshold distance before an upcoming turn) using the relatively more-accurate GPS communication to get the user back on track as quickly and/or easily as possible.

However, if an affirmative determination is instead made at diamond 512, the logic may instead proceed to block 516.

At block 516 the logic may use a second rate of satellite communication for a second portion of the route, as might have been determined for the second portion of the route at block 506. For example, should it be determined that the directions are being followed at diamond 512 but that the first portion of the route has ended and that the second portion of the route has begun (e.g., going from a city street to a highway), at block 516 the device may use the second rate of satellite communication.

Also at block 516, in between satellite communications the device may use other methods of tracking its position as it traverses the route (such as the other methods disclosed above in reference to block 510). For example, dead reckoning may be performed and/or triangulation may be performed based on communication with plural cellular base stations. From block 516 the logic may proceed to decision diamond 518.

At diamond 518 the device may again determine whether the directions are being followed, similar to the determination made at diamond 512. If an affirmative determination is made at diamond 518, the logic may proceed back to block 508 and proceed therefrom to output directions and communicate with satellites at rates determined at block 506 to ultimately navigate the user to the destination. However, should a negative determination be made at diamond 518, the logic may instead move to block 514. After arriving at block 514 from diamond 518, the device may use a relatively faster rate of communication with the satellites (in this case, faster than the second rate) to receive more frequent updates on the current location of the device using the device's relatively more accurate but power consuming GPS transceiver.

Figure 6:
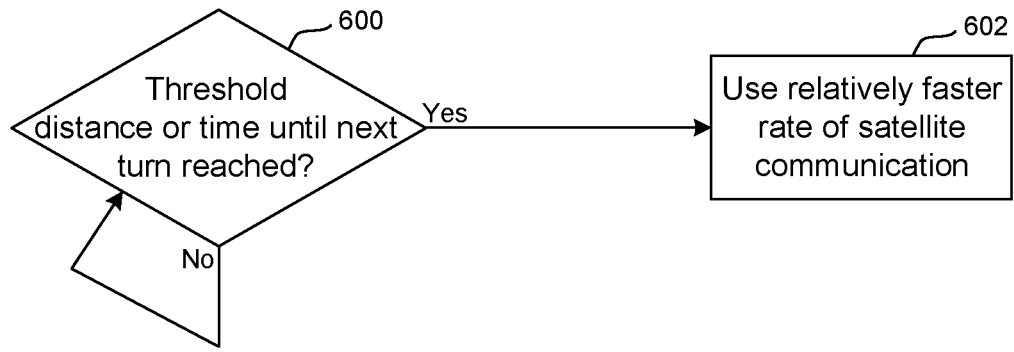
Figure 7:
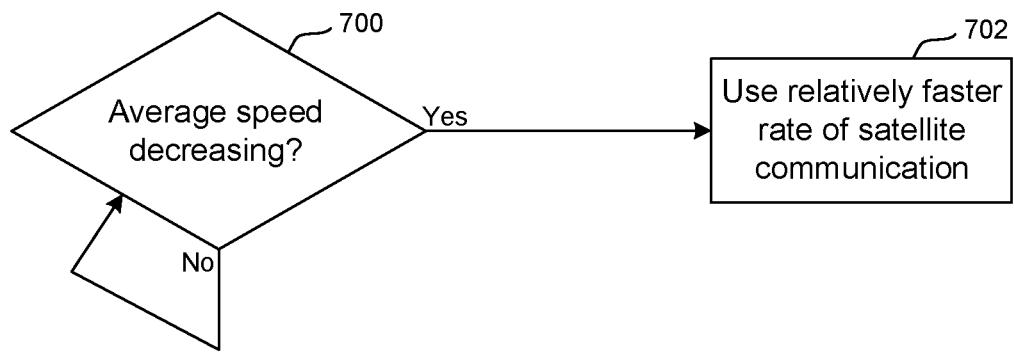
Figure 8:
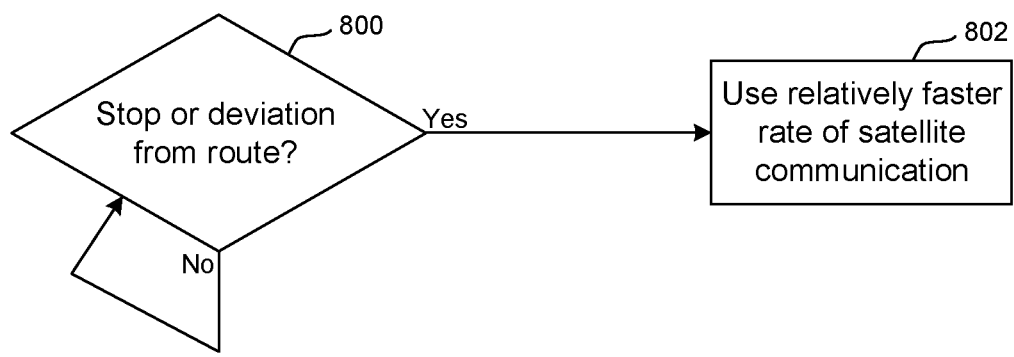

FIGS. 6-8 show example logic flows that may be used in conjunction with and/or separate from the logic of FIG. 5. The logic of these figures is shown in flow chart format but, in effect, state logic may also be used. In any case, the determinations discussed in reference to these figures may be made, e.g., after the device begins outputting the directions at block 508 for following the route to the user-indicated destination.

Beginning first with FIG. 6, at decision diamond 600 the logic may determine whether a threshold distance and/or threshold time has been reached from before a next turn to follow the route will be reached. A negative determination may cause the device to continuing making the determination at diamond 600 until an affirmative one is made. Then, once an affirmative determination is made, the logic may continue on to block 602 where the device may use a relatively faster rate of satellite communication than it was previously using.

For instance, the determination at diamond 600 may be made so that upon reaching a threshold time of thirty seconds before the device is estimated to be making a turn from one road onto another road to continue on the route, an affirmative determination may be made. The estimation of when the device will reach the turn may be made, e.g., based on a current speed at which the device is traveling, an expected rate of deceleration as the device approaches the turn, and a distance from the device's current location until the location of the turn.

As another example, the determination at diamond 600 may be made so that upon reaching a threshold distance of fifty feet before an estimated location at which the device will make a turn from one road onto another road to continue on the route, an affirmative determination may be made. E.g., the estimated location may be the expected location of the turn itself or a center point of the intersection of the two roads, and the threshold distance may be a predetermined distance before that point.

FIG. 7 shows another example of logic that may be executed in accordance with present principles. At decision diamond 700 the logic may determine whether an average speed at which the user is traveling is decreasing. The determination may be made, for example, by comparing location data over time to determine whether the user/device is accelerating, decelerating, or staying at a constant speed as time goes on. Additionally, or alternatively, the determination may be made based on speed data received from the on-board computer of the vehicle in which the device and user are traveling (e.g., received over Bluetooth communication). A negative determination may cause the device to continuing making the determination at diamond 700 until an affirmative one is made. Then, once an affirmative determination is made, the logic may continue on to block 702 where the logic may use a relatively faster rate of satellite communication than it was previously using.

FIG. 8 shows yet another example of logic that may be executed in accordance with present principles. At decision diamond 800 the logic may determine whether the user/device has stopped (e.g. is no longer moving or is staying at a particular location) or has deviated from the route to continue travelling elsewhere. The device may make this determination by, for example, by comparing location data over time to determine whether the user/device is at the same location as it was at a previous time (for stopping), or by comparing current location data for the device to location data for points along the route to determine whether the device is still on the route or has deviated (for deviation). Also for stopping, the device may receive speed data from the vehicle's on-board computer to determine whether the device is still moving or has stopped.

A negative determination may cause the device to continuing making the determination at diamond 800 until an affirmative one is made. Then, once an affirmative determination is made, the logic may continue on to block 802 where the logic may use a relatively faster rate of satellite communication than it was previously using.

Figure 9:
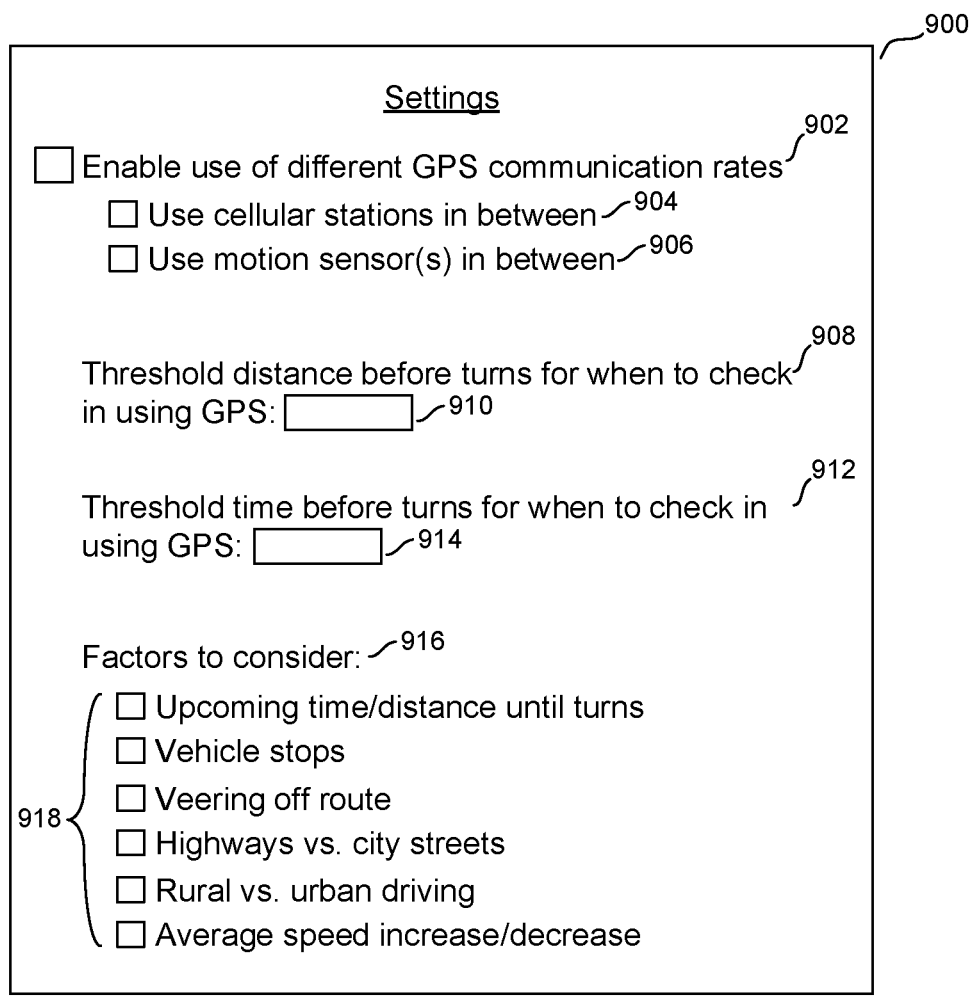

Continuing the detailed description in reference to FIG. 9, a UI 900 is shown for configuring settings of a device and/or directions software in accordance with present principles. Each of the options and sub-options to be discussed below may be selected using the respective check box shown adjacent to each respective option/sub-option.

Beginning first with option 902, it may be selected to enable use of different satellite communication rates in accordance with present principles. For example, option 902 may be selected to enable the device to undertake the logic of any or all of FIGS. 5-8. Option 902 may also be accompanied by sub-options 904 and 906. Sub-option 904 may be selected to enable use of cellular base station communication in between satellite communications as disclosed herein. Sub-option 906 may be selected to enable use of dead reckoning and/or motion sensor input in between satellite communications as disclosed herein.

The UI 900 may also include a setting 908 at which a user may specify a threshold distance before turns to be used for when the device is to communicate more frequently with a satellite in accordance with present principles. The threshold distance may be specified by directing input to input box 910.

Still further, the UI 900 may include a setting 912 at which a user may specify a threshold time before turns to be used for when the device is to communicate more frequently with a satellite in accordance with present principles. The threshold time may be specified by directing input to input box 914.

The UI 900 may further include a setting 916 at which a user may specify one or more factors for the device to use when determining rates at which GPS satellite communication is to be performed and/or whether to communicate at a faster rate. Options 918 for various factors may thus be presented and may be selectable to respectively enable use of upcoming times and/or distances until turns, vehicle stops, veering or deviating off route, types of roads to be traversed (e.g., city streets versus highways), types of regions to be traversed (e.g., rural vs. suburban vs. urban driving), and average speed increases and/or decreases. Still other factors may be listed, such as any of the other factors disclosed herein.

Before concluding, it is to be understood that although a software application for undertaking present principles may be vended with a device such as the system 100, present principles apply in instances where such an application is downloaded from a server to a device over a network such as the Internet. Furthermore, present principles apply in instances where such an application is included on a computer readable storage medium that is being vended and/or provided, where the computer readable storage medium is not a transitory, propagating signal and/or a signal per se.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:
1. A device, comprising:
at least one processor;
a global positioning system (GPS) transceiver accessible to the at least one processor;
a motion sensor accessible to the at least one processor; and
storage accessible to the at least one processor and bearing instructions executable by the at least one processor to:
present a graphical user interface (GUI) on a display accessible to the at least one processor, the GUI comprising an option that is selectable by a user to set the device to vary rates at which the GPS transceiver is to communicate with at least one satellite for outputting directions;
identify first directions to a location;
determine, based on the option being selected and based on one or more factors related to the first directions, at least a first rate at which the GPS transceiver is to communicate with at least one satellite for outputting the first directions;
output the first directions for following a route to the location; and
communicate with the at least one satellite at the first rate for at least a portion of the outputting of first directions.
2. The device of claim 1, wherein the instructions are executable by the at least one processor to:
in between communications with the at least one satellite at the first rate for at least the portion of the outputting of the first directions, use dead reckoning to make a determination regarding the first directions.

3. The device of claim 2, wherein the determination based on the one or more factors comprises a determination regarding whether the first directions are being followed.

4. The device of claim 3, wherein the instructions are executable by the at least one processor to:
receive input from the motion sensor;
use the input from the motion sensor and dead reckoning to make the determination regarding whether the first directions are being followed.

5. The device of claim 4, wherein the instructions are executable by the at least one processor to:
responsive to a determination that the first directions are not being followed, communicate with the at least one satellite at a second rate that is faster than the first rate.

6. The device of claim 1, wherein the portion is a first portion, and wherein the instructions are executable by the at least one processor to:
determine, based on the option being selected and based on the one or more factors, at least first and second rates at which the GPS transceiver is to communicate with the at least one satellite for outputting the first directions, wherein the first rate is different from the second rate;
output the first directions for following the route;
communicate with the at least one satellite at the first rate for at least the first portion of the outputting of the first directions; and
communicate with the at least one satellite at the second rate for at least a second portion of the outputting of the first directions, the second portion being different from the first portion.

7. The device of claim 6, wherein the instructions are executable by the at least one processor to:
use the first rate during traversal of a road of a first road type; and
use the second rate during traversal of a road of a second road type.

8. The device of claim 7, wherein the first road type is a highway road type, and wherein the second road type is a city street road type.

9. The device of claim 7, wherein use of the first rate is based on an estimated time until a turn is to be made to follow the route.

10. The device of claim 1, wherein the device comprises a cellular communication transceiver that is accessible to the at least one processor, and wherein the instructions are executable by the at least one processor to:
in between communications with the at least one satellite at the first rate for at least the portion of the outputting of the first directions, use the cellular communication transceiver to determine whether the first directions are being followed.

11. The device of claim 10, wherein the cellular communication transceiver is used to triangulate a current location of the device.

12. A method, comprising:
providing, using a device, directions to follow a route to a destination; and
varying, based at least in part on at least one speed limit for at least a portion of the route, a speed at which a global positioning system (GPS) transceiver on the device communicates with at least one satellite for providing the directions;
wherein the speed varies at least in part based on one or more factors identified by one or more of the device and a server in communication with the device;
wherein the one or more factors comprise one or more of stopping at a point along the route and stopping near a point along the route.

13. The method of claim 12, wherein the speed varies so that a first speed is used during traversal of a first part of the route and a second speed is used during traversal of a second part of the route, wherein the second speed is faster than the first speed.

14. The method of claim 12, comprising:
using, in between communications of the GPS transceiver with the at least one satellite, input from one or more of a motion sensor and a cellular communication transceiver to track whether the route is being followed.

15. The method of claim 12, comprising:
presenting a graphical user interface (GUI) on a display, the GUI comprising a setting that is selectable by a user to enable the device to vary speeds at which the GPS transceiver communicates with at least one satellite; and
varying, based at least in part on the setting being enabled, the speed at which the GPS transceiver communicates with at least one satellite for providing the directions.

16. The method of claim 12, wherein the speed varies at least in part based on user input received at a selector presented on a display.

17. An apparatus, comprising:
a first processor;
a network adapter; and
storage bearing instructions executable by at least one second processor of a first device for:
providing directions to follow a route to a destination; and
varying a rate at which a global positioning system (GPS) transceiver accessible to the second processor communicates with a second device for providing the directions, wherein the rate at which the GPS transceiver communicates with the second device for providing the directions varies based on user input received at a selector presented on a display;
wherein the first processor transfers the instructions to the first device over a network via the network adapter.

18. The apparatus of claim 17, wherein the instructions are executable by the second processor for:
using, in between communications of the GPS transceiver with the second device, input from one or more of a motion sensor and a cellular communication transceiver; and
varying the rate at which the GPS transceiver communicates with the second device so that a first rate is used during traversal of a first part of the route and a second rate is used during traversal of a second part of the route, wherein the second rate is faster than the first rate.

19. The apparatus of claim 17, wherein the selector is presented on the display as part of a graphical user interface (GUI) presented on the display, and wherein the GUI comprises text indicating that selection of the selector will vary the rate at Which the GPS transceiver communicates with the second device for providing the directions.

20. The apparatus of claim 17, wherein the instructions are executable by the second processor for:
presenting a graphical user interface (GUI) on a display accessible to the second processor, the GUI comprising an option that is selectable by a user to enable the second processor to vary rates at which the GPS transceiver communicates with the second device to output future directions.

\* \* \* \* \*